Oct. 23, 1951 C. E. WRIGHT 2,572,418
PIPE NIPPLE CHUCK
Filed Sept. 11, 1948 2 SHEETS—SHEET 1

INVENTOR
CLYDE E. WRIGHT
BY
J. D. Douglas

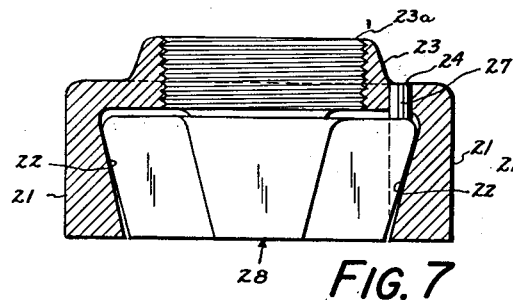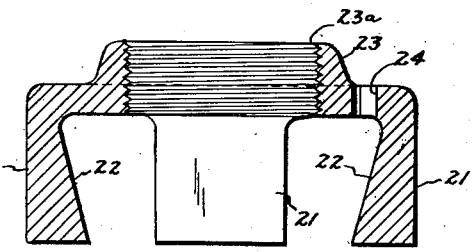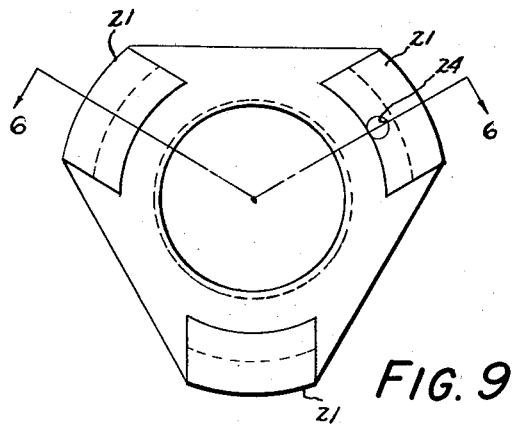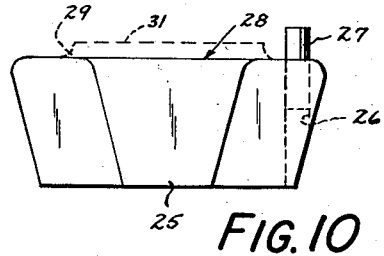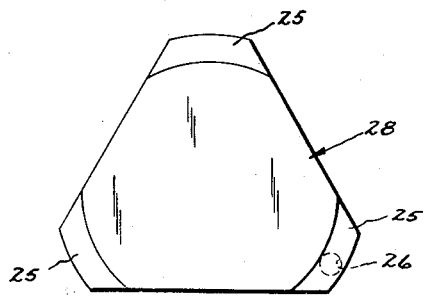
INVENTOR.
CLYDE E. WRIGHT

Patented Oct. 23, 1951

2,572,418

UNITED STATES PATENT OFFICE 2,572,418

PIPE NIPPLE CHUCK

Clyde E. Wright, Elyria, Ohio, assignor to Ridge Tool Company, Elyria, Ohio

Application September 11, 1948, Serial No. 48,800

11 Claims. (Cl. 279—48)

This invention relates to pipe holding chucks and more particularly to a chuck for holding a short pipe nipple for threading.

After cutting the threads on one end of a nipple, the problem of cutting threads in the other end, where the nipple is short, requires that the nipple be held securely on the threaded end. The difficulty is that the threaded end must not be mutilated and that the nipple should be readily removable after the second set of threads is cut.

Several devices have been proposed for supporting a nipple. Some of these chucks utilize a threaded hole which is loose fitting with the nipple. An adjustable stop is provided to prevent the nipple from being screwed too far into the threads on the chuck and which, upon release, makes possible the easy withdrawal of the nipple by unscrewing it by hand. However, all of these devices rely on an external, clumsy, adjusting member.

The present invention utilizes the force of a vise, which holds the chuck to automatically hold the nipple stop and to automatically release it when the threads are cut. The result is a simple and compact device which can be stored in a small space in a tool kit, is easily carried, is economical of manufacture, and cannot readily be broken or rendered inoperative. No special wrenches are needed, and the structure is such that the parts are not subject to accidental disassembly with the resultant loss of some of the parts.

In order to better illustrate, and more readily describe the invention, reference is made to the following drawings.

Fig. 7 is a vertical medial section of a modified form of the invention;

Fig. 8 is a similar view with the nipple stop removed;

Fig. 9 is an end view of the housing with the stop removed; and

Figs. 10 and 11 are end and side elevational views respectively of the nipple stop removed from the housing.

Figure 1:
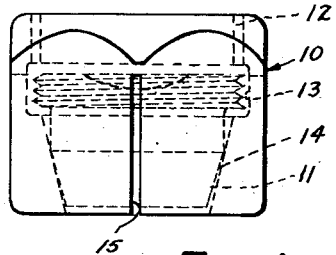
Fig. 1 is an elevational view of a nipple chuck according to the invention.
Figure 3:
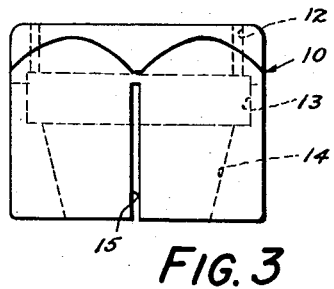
Fig. 3 is a side view of the outer chuck housing with the inner parts removed.
Figure 2:
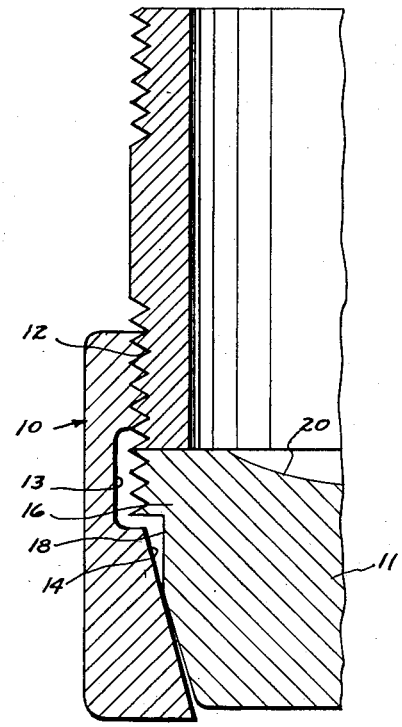
Fig. 2 is an enlarged medial sectional view of the invention showing a nipple in place.
Figure 4:
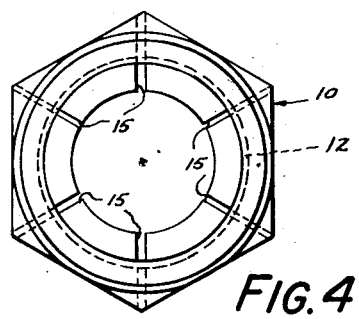
Fig. 4 is a plan or end view thereof.

My invention broadly includes a threaded housing into which a nipple may be secured and which is provided with a stop against which the nipple may abut. The housing may be clamped in a vise which also causes the positioning of the nipple stop, and thus held, the nipple may then be threaded. More specifically, and referring to the drawings throughout which like parts are designated by like reference symbols.

My invention comprises primarily two parts; an external housing 10 and a bushing, or stop 11. In one embodiment the housing 10 in its outside form may partake of a hexagonal or other generally polygonal form which may be clamped in a vise. It is provided with an internal bore comprising three distinct portions. The first portion 12 is of the proper size and pitch to receive the threaded end of a nipple of a specific size which the chuck is intended to support. The threads, although of the same pitch as the nipple, are of such loose fit that the nipple can easily be screwed in or out by hand.

The second portion 13 of the bore comprises an annular groove or channel of such size that its larger diameter provides a moderate clearance with the major diameter of the threads of the threaded portion 12 for receiving the stop as later set forth.

The third portion 14 of the bore provides a conically tapered wall with the large end of the cone towards the relieved portion of the bore. Slots 15 are cut through the wall of the housing into the tapered section 14 to all the flat faces of the housing. These slots extend slightly into the relieved portion 13 of the bore. It is seen that this enables the wall 14 or skirt portion of the housing when clamped tightly in a vise to be compressed inwardly, which is further facilitated by the wall of reduced cross section at the channel 13.

Figure 5:
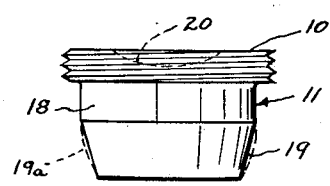
Fig. 5 is an elevational view of the interior element or stop, an alternative form of the tapered surfaces being shown by dotted lines.

The stop 11 in this embodiment may be a solid piece as best shown in Fig. 5. The upper part is provided with a flange 16, the threads of which may be screwed freely through the threads 12 of the housing. Below this, and of somewhat smaller diameter, is a short straight cylindrical section 18 forming a shoulder with the threaded portion 16. From the cylindrical part a downwardly extending frustro-conical portion 19 is provided of a contour which matches that of the tapered conical wall 14 of the housing. An alternative form of this stop envisions a tapered portion which is not conical but instead has curved elements as shown by the dotted lines 19a in Fig. 5. This form, because of its tangential engagement with the walls of the housing would insure more free movement of the stop in the housing.

To assemble the device, it is necessary only to screw the stop member 11 into the housing. The proportions of the pieces are such that when the housing is clamped tightly in a vise by the faces parallel to the slots 15, the inward movement of the portions forming the wall 14 of the tapered section has a camming action on the stop 11 and forces the stop upward and toward the threaded opening 12. Clearance then is opened between the shoulder at the base of threads 16 and the lower surface of the relieved portion 13 of the bore in the housing. A pipe nipple may then be screwed into the threads 12 and will bottom firmly against the upper face of the stop 11, and because it is firmly held, the free end may now be threaded. During the threading operation, the nipple is screwed more securely home in the chuck. When the threading operation is completed, however, and the threading die removed, then upon release of pressure by the vise on the side of the housing, the stop will drop down in the bore and release pressure on the nipple, permitting it to be easily screwed out of the chuck by hand.

Figure 6:
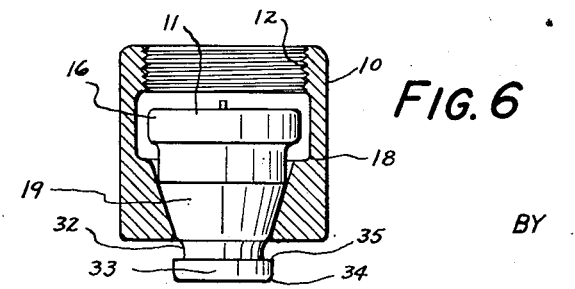
Fig. 6 is a medial sectional view showing an alternative form of the nipple stop.

Another alternative form of the stop is shown in Fig. 6. The stop 11 is similar to that described above except in the means used to assemble it into the housing. In this form the flange 16 has no threads but is of such size that it can be inserted through the threads on the housing. At the small end of the frustro-conical portion 19 of the stop is a relieved section 32 of sufficient length and depth to provide clearance with the skirt portion of the housing when compressed. The end portion 33 of the stop is formed to a diameter slightly larger than the smallest diameter of the bore in the housing. The corners 34 of this end portion 33 may be broken to a radius as shown. One advantage of this form is in its ease of assembly. It is necessary only to push the stop into the housing until the enlarged end passes through the smallest diameter of the housing and the skirt portion again assumes its original relaxed position. The stop is then loosely held in place by the shoulder 35 formed by the relieved section 32 and enlarged end 33 and the tapered walls of the frustro-conical portion 19. Another advantage of this form is that because of its mode of assembly it is not likely to become disassembled inadvertently; that is, the stop cannot accidentally thread itself into the threads 12, as it might do when carried around in a tool box or the like.

An alternative embodiment, the action of which is substantially the same as the first, is shown in Figs. 7-11. In this embodiment, the housing is formed with three posts 21 which are arranged to be engaged in a pipe vise or a three-jawed chuck. The inner walls 22 of the posts 21 are tapered to a conical shape. The end of the housing is formed with a boss 23 which is threaded at 23a similar to the bore in the housing previously described. Adjacent the boss in the end of the housing and in line with any one of the posts 21 is drilled a hole 24 which is of such size as to provide a loose slip fit with an aligning pin hereafter described.

The stop 28 in this alternative embodiment is of a substantially triangular cross section from the corners 25 being cut off to a conical shape, or a curved taper as described in the first embodiment. These surfaces at the corners 25 are of such size and taper that they fit loosely between the posts 21 of the housing. The stop is of such size that the sides of the base will pass the posts 21 of the housing and can then be turned through 30 degrees and will be held in place against fore and aft movement by the posts.

At a point corresponding to the hole 24 in the housing, a hole 26 in the stop 28 is provided into which a pin 27 can be pressed. Thus with the stop properly located in the housing, the pin 27 which is a loose fit in the hole 24 can be pressed into the hole 26 in the stop, thus providing a permanent assembly.

If desired, the face 29 of the stop may be provided with a boss 31 which extends toward and into the threaded core 23a. The operation of the device is substantially the same as for that of the previously described embodiment. The housing is placed in a pipe vise or three jawed chuck, with the jaws of the vise or chuck in engagement with the surface posts 21. The pressure on the posts causes them to be bent slightly toward the center line of the device, forcing the inner faces 22 against the stop faces 25 and moving the same slightly toward the threaded opening 23a. A nipple may then be threaded in the opening until the end abuts the stop 28 or the boss 31 on the stop when a boss is used. The nipple is then threaded, which causes it to be even more securely screwed into the device; after the threading operation is completed and the threading die removed, if the nipple is not already loose enough to be removed by hand, releasing the pressure of the vise or chuck holding the device will cause the posts to spring apart to their original position, and the stop moves away from the nipple which may then be easily removed.

It will be noted that no special tools or wrenches are needed in connection with the operation of the device, and that, therefore, there are no wrenches to get lost or wear out. The unit is simple, compact and rugged.

Furthermore, since no wrenches are needed, it can be secured in any position in a vise or chuck, the only precaution to be observed being that it is gripped so as to allow the posts or walls to be bent inward.

Having thus described my invention, I am aware that numerous and extensive departures may be made from its form without departing from the spirit or scope thereof.

I claim:

1. A nipple chuck comprising a nipple holding housing having one end threaded for holding the nipple and having inclined internal walls and a plug loosely disposed therein so that upon movement of the walls toward the center of said housing, said plug is urged into abutting stopping engagement with the nipple.

2. A nipple chuck comprising a nipple holding housing having a threaded portion for holding the nipple and a skirt portion having an inclined internal wall, said skirt portion being slotted at intervals around the circumference and a stop loosely disposed therein having an inclined external wall for sliding engagement with the internal walls of said skirt portion and arranged so that upon compression of said skirt portion toward its center, said stop is forced into abutting stopping engagement with the nipple.

3. A nipple chuck comprising a nipple holding housing having a threaded portion for holding the nipple and a skirt portion having conically tapered internal walls, said skirt portion being slotted at intervals around its circumference and a stop loosely disposed therein having external walls of a curved taper for tangential engagement with the internal walls of said skirt portion and arranged so that upon compression of said skirt portion, said stop is forced into abutting stopping engagement with the nipple.

4. A nipple chuck comprising a nipple holding housing and a stop loosely disposed therein, said housing having external surfaces for engagement with a chuck or vise and having an internal bore, said bore comprising a threaded portion at one end for holding the nipple, a relieved portion to allow free movement of said stop and a skirt portion having inclined internal walls, said skirt portion being slotted at intervals around its circumference, said stop having a threaded end for engagement with said threads of said housing for insertion of said stop into said bore of said housing and having tapered walls on the other end arranged so that upon compression of said skirt portion, said stop is forced into abutting stopping engagement with the nipple.

5. A nipple chuck comprising a nipple holding housing having a threaded end for holding the nipple and having three posts circumferentially spaced, said posts having inclined internal surfaces, a stop loosely disposed within said housing, said stop being of basically triangular cross section but having the corners of said cross section rounded forming a conical taper on said stop for sliding engagement with the inner surfaces of said posts arranged so that upon movement of said posts toward the center of said housing, said stop is forced into holding engagement with the nipple.

6. A nipple chuck comprising a nipple holding housing having a threaded end for holding the nipple and having three posts circumferentially spaced, said posts having inclined internal surfaces, a stop loosely disposed within said housing, said stop being of basically triangular cross section but having the corners of said cross section rounded forming a conical taper on said stop for sliding engagement with the inner surfaces of said posts arranged so that upon movement of said posts toward the center of said housing, said stop is forced into holding engagement with the nipple, and guide means comprising a pin pressed into a hole in said stop and slidably disposed in said housing to prevent turning of said stop in said housing.

7. A nipple holding chuck including a housing having exterior walls formed for engagement with a holding device, said walls being formed with kerfs to permit portions of the wall to be forced inwardly, one end of said housing being formed with a threaded bore for the reception of the threaded end of a piece of pipe or the like, the wall of said housing adjacent said threaded bore being weakened by an annular channel formed therein, a bore extending through the remainder of the housing coaxial to the other bores and formed to provide a substantially frustro-conical inner wall, a stop plug for said housing comprising a member having a threaded flange on one end, a cylindrical portion adjacent said flange, and a frustro-conical end portion, said threaded flange adapted to be threaded through said bore and when threaded through the bore to be disposed in said annular channel, said frustro-conical end portion being disposed for engagement with said frustro-conical inner wall.

8. A nipple holding chuck including a housing having exterior walls formed for engagement with a holding device, said walls being formed with kerfs to permit portions of the wall to be forced inwardly, one end of said housing being formed with a threaded bore for the reception of the threaded end of a piece of pipe or the like, the wall of said housing adjacent said threaded bore being weakened by an annular channel formed therein, a bore extending through the remainder of the housing coaxial to the other bores and formed to provide a substantially frustro-conical inner wall, a stop plug for said housing comprising a member having a threaded flange on one end, a cylindrical portion adjacent said flange, and an end portion having a curved surface thereon, said threaded flange adapted to be threaded through said bore and when threaded through the bore to be disposed in said annular channel, said curved end portion being disposed for tangential engagement with said frustro-conical inner wall.

9. An apparatus of the class described comprising a housing having exterior walls for holding engagement with a vise or chuck and having one end threaded for the reception of a pipe or the like and a skirt portion having inner cam surfaces; said skirt portion being slotted at intervals around the walls and a stop plug having complementary cam surfaces to said skirt portion and having an enlarged end portion arranged to be forcibly inserted through said skirt portion and to extend without the housing when the device is in use.

10. An apparatus of the class described including a housing having exterior walls formed for engagement with a holding device, said walls being formed with kerfs to permit portions of said walls to be forced inward toward the center of said housing, one end of said housing being formed with a threaded bore for the reception of the threaded end of a piece of pipe or the like, the wall of said housing adjacent said threaded bore being weakened by an annular channel formed therein, a bore extending through the remainder of the housing co-axial with the other bores and formed to provide a substantially frustro-conical inner wall, and a stop plug for insertion into said housing having a flange on one end for abutting engagement with said piece of pipe or the like, a cylindrical portion adjacent said flange, a frustro-conical portion for slidable matching engagement with said frustro-conical inner wall of said housing, a relieved portion adjacent said frustro-conical portion for reception of the edges of said kerfed walls when compressed and an enlarged end portion adjacent said relieved portion arranged for forcible insertion through the minor diameter of said frustro-conical bore of said housing.

11. A nipple chuck comprising a housing threaded at one end to receive a threaded pipe or the like, said housing being formed with a portion extending from said threaded end, the walls of said extending portion being adapted to be moved toward the center of said portion, a stop member loosely disposed within said portion, said stop member being formed to be moved into abutting holding engagement with said threaded pipe upon movement of said walls.

CLYDE E. WRIGHT.

REFERENCES CITED

The following references are of record in the file of this patent:

UNITED STATES PATENTS

| Number | Name | Date |
| --- | --- | --- |
| 386,262 | Pedersen | July 17, 1888 |
| 801,767 | Cleveland | Oct. 10, 1905 |
| 1,514,357 | Whelan | Nov. 4, 1924 |